A. W. ARRAS.
LAMP TILTING DEVICE.
APPLICATION FILED APR. 25, 1917.
1,246,034. Patented Nov. 13, 1917.
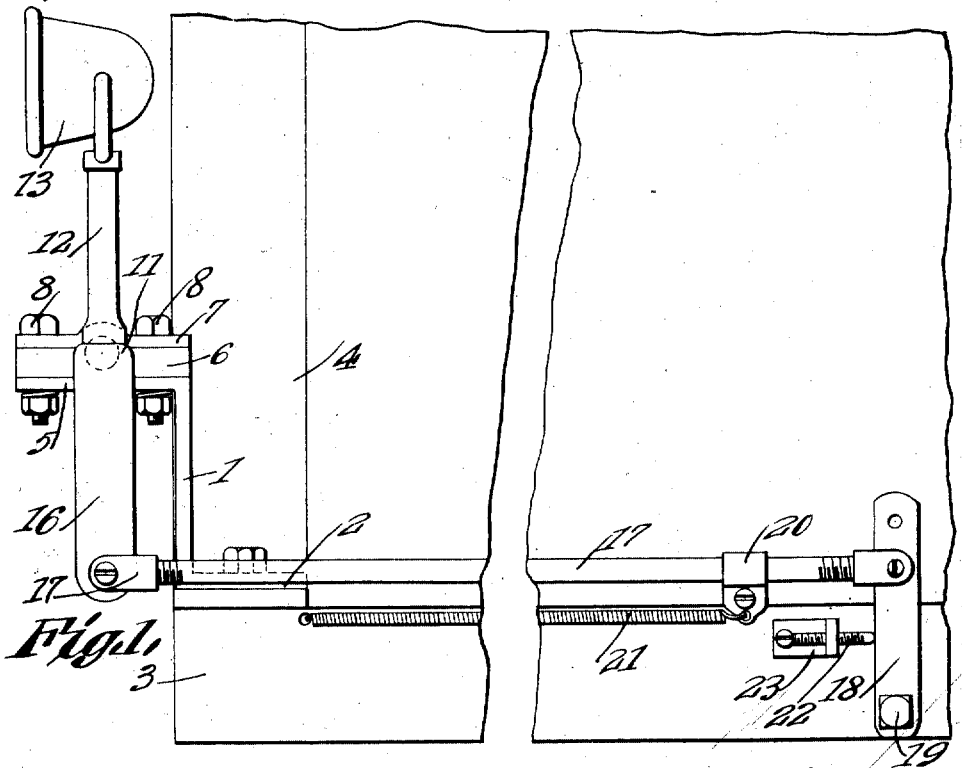
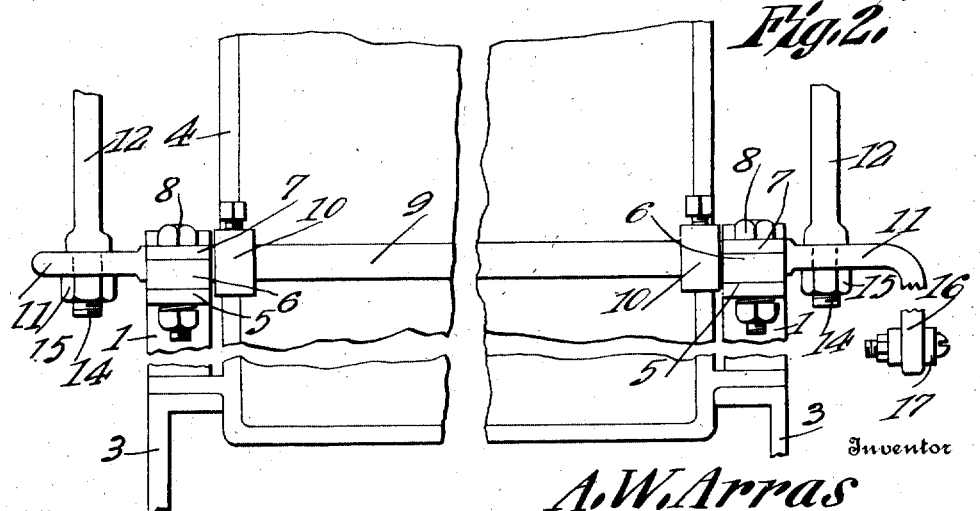
Inventor
A. W. Arras
By C. A. Snow & Co.
Attorney
Witness

UNITED STATES PATENT OFFICE.

ADAM W. ARRAS, OF JENERA, OHIO.

LAMP-TILTING DEVICE.

1,246,034.  Specification of Letters Patent.  Patented Nov. 13, 1917.

Application filed April 25, 1917. Serial No. 164,468.

*To all whom it may concern:*

Be it known that I, ADAM W. ARRAS, a citizen of the United States, residing at Jenera, in the county of Hancock and State of Ohio, have invented a new and useful Lamp-Tilting Device, of which the following is a specification.

The present invention relates to a lamp tilting device for use upon automobiles, and aims to provide a novel and improved yet simple and inexpensive attachment for various motor vehicles, which is operable for tilting the head lights or lamps to direct the rays of light downwardly, in order not to dazzle or blind the occupants of another approaching vehicle, which not infrequently results in accidents.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation of the device, portions being broken away.

Fig. 2 is a front view thereof, portions being broken away.

In carrying out the invention, there is provided a pair of standards 1 provided at their lower ends with rearwardly extending feet 2 adapted to be bolted or otherwise secured upon the frame 3 of the vehicle at opposite sides of the radiator 4. The standards 1 are provided at their upper ends with forwardly extending brackets 5 upon which are seated bearings 6 having the removable caps 7. The bolts 8 which secure the bearings upon the brackets 5 also secure the caps of the bearings in place.

A transverse rock shaft 9 is journaled in the bearings and extends across or in front of the radiator. Collars 10 are secured upon the shaft 9 by means of set screws or otherwise, and are arranged at the inner sides of the bearings 6 to prevent the longitudinal movement of the shaft 9. The shaft is provided at the outer sides of the bearings with flattened portions 11 which carry the upstanding lamp posts or brackets 12, each of which carries one lamp or headlight 13 of any suitable sort. The lower ends of the posts 12 have reduced portions 14 extending downwardly through the portions 11 and secured thereto by means of nuts 15 or other retaining elements engaged upon said reduced portions and bearing upwardly against the portions 11 of the rock shaft.

In order to oscillate the rock shaft, it is provided at one end with a depending arm 16 having pivoted thereto the forward end of a rearwardly extending link 17, which has its rear end pivoted to a lever 18 fulcrumed to the frame 3 of the vehicle, as at 19. This lever 18 can be operated by any suitable operating lever or member (not shown) to be controlled by the hand or foot.

A clip 20 embraces the link or rod 17 and is connected by a coiled wire retractile spring 21 with the frame 3 and has a tendency to move the link 17 forwardly, thereby swinging the arm 16 forwardly and the posts 12 rearwardly to vertical position whereby to direct the light straight ahead as usual. A stop screw 22 is disposed in the path of movement of the lever 18 for stopping it and limiting the movement of the link 17 and arm 16 under the influence of the spring 21. This screw 22 is carried for adjustment by a bracket 23 bolted or otherwise secured to the frame 3 in front of the lever 18. The screw 22 can be adjusted to properly limit the movement of the working parts, whereby when the device is released, the posts 12 will be held in the desired position to direct the light ahead properly.

By swinging the lever 18 rearwardly, this moves the link 17 which in turn pulls the arm 16 rearwardly, to swing the posts 12 forwardly. The lamps will therefore be tilted to lower the rays of light and direct them downwardly at an angle. This will provide sufficient illumination ahead of the vehicle for purpose of safety during darkness, but it will not direct the rays of light into the passengers of an approaching vehicle, thus avoiding possible collision or accident. By thus tilting the lamps, the desired result is obtained without dimming the lights or extinguishing them as is sometimes done.

Having thus described the invention, what is claimed as new is:—

1. A lamp tilting device embodying a rock shaft, an upstanding lamp post carried by said shaft, an actuating lever, an arm carried by said shaft, a rod connecting said arm and lever, a clip embracing said rod, a spring connected to the clip for swinging the lamp post upwardly and rearwardly, a bracket, and a stop screw carried by the bracket in the path of movement of said lever when swung by said spring.

2. A lamp tilting device embodying a pair of standards having rearwardly extending feet attachable to a vehicle frame, said standards having forwardly projecting brackets at their upper ends, sectional bearings secured upon said brackets, a transverse rock shaft journaled between the sections of the bearings, an upstanding lamp post carried by the shaft, said shaft having an arm, and an operating mechanism connected to said arm.

In testimony that I claim the foregoing as my own, I have hereto affixed my signature in the presence of two witnesses.

ADAM W. ARRAS.

Witnesses:
ALFRED GRABER,
DAVID SEPPANEN.